Feb. 9, 1971 K. B. CLELAND 3,561,188
METHOD OF LOADING ARTICLES INTO AND UNLOADING
THEM FROM CELLULAR CONTAINERS
Original Filed Dec. 27, 1966 7 Sheets-Sheet 3

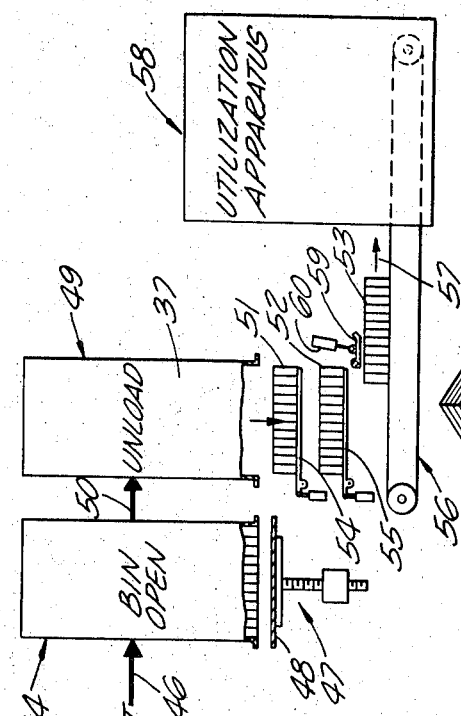

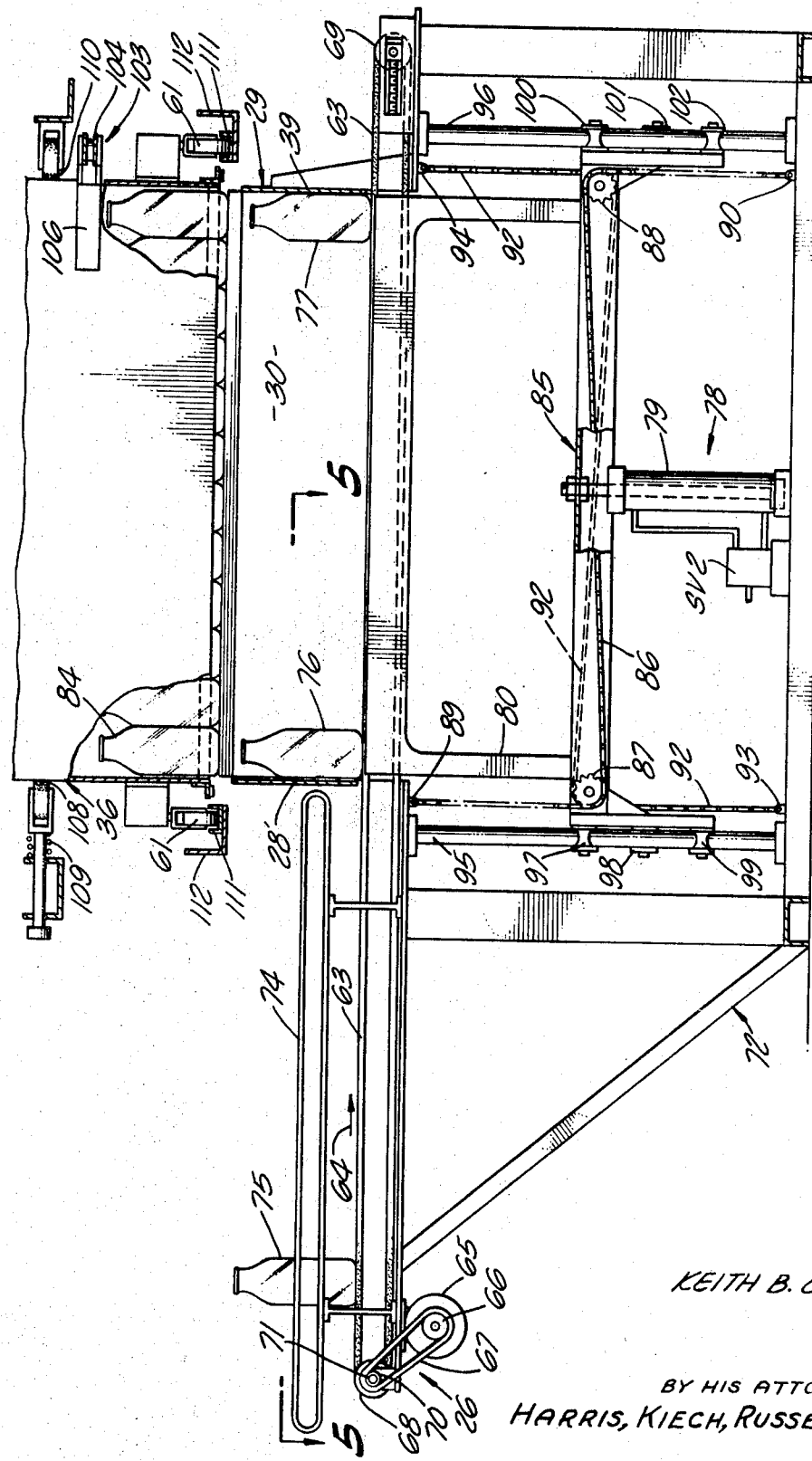

KEITH B. CLELAND
INVENTOR.

BY HIS ATTORNEYS.
HARRIS, KIECH, RUSSELL & KERN

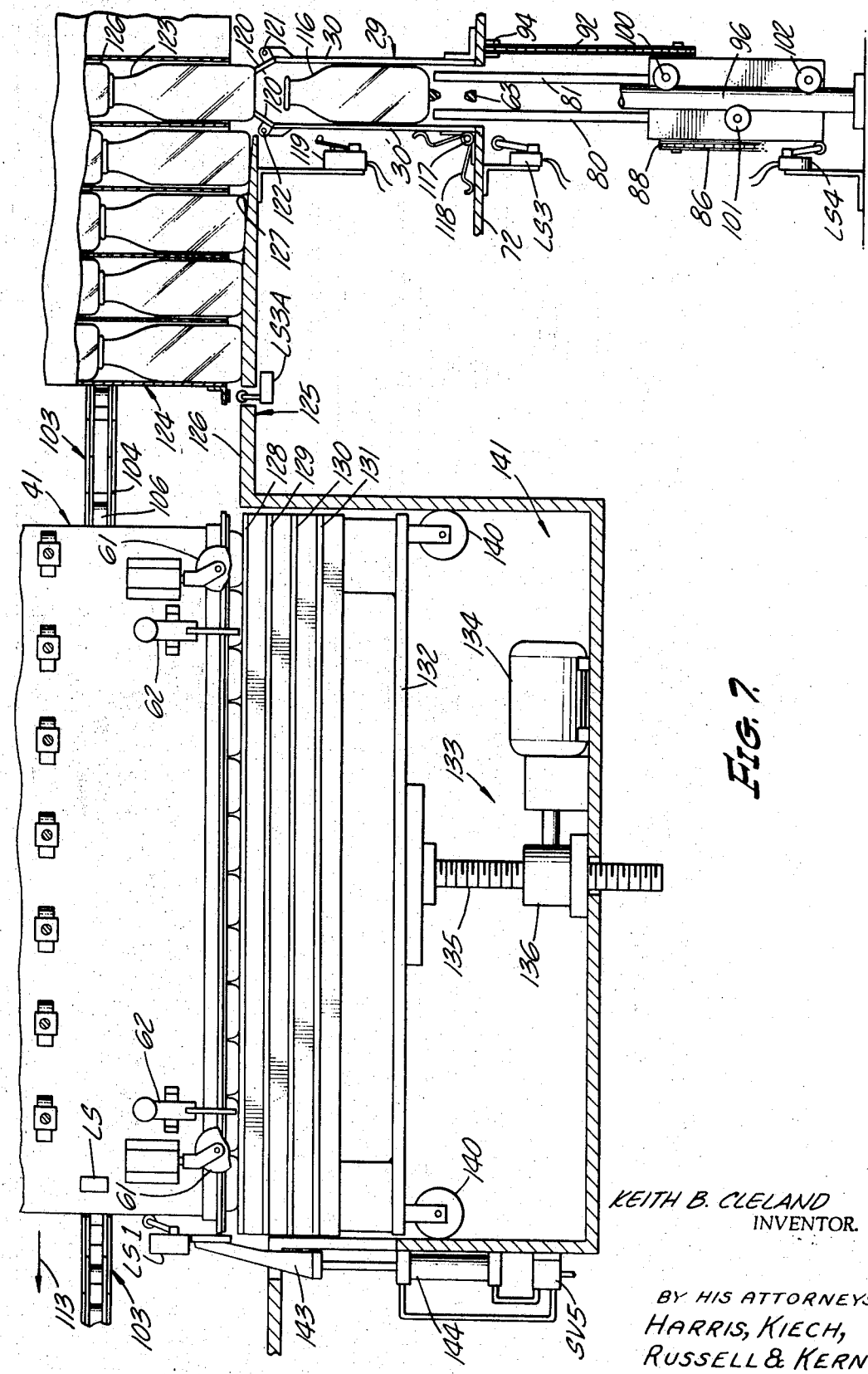

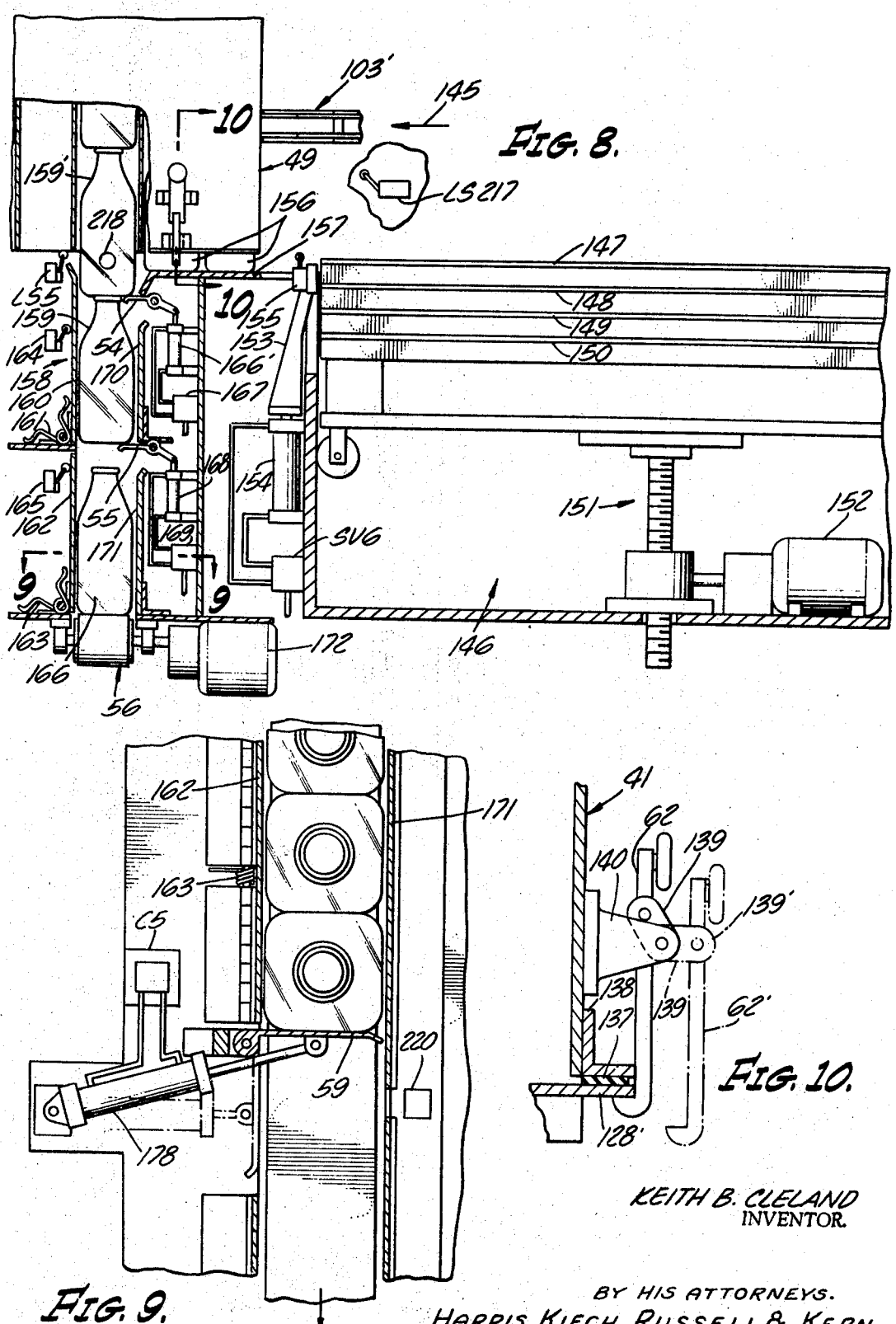

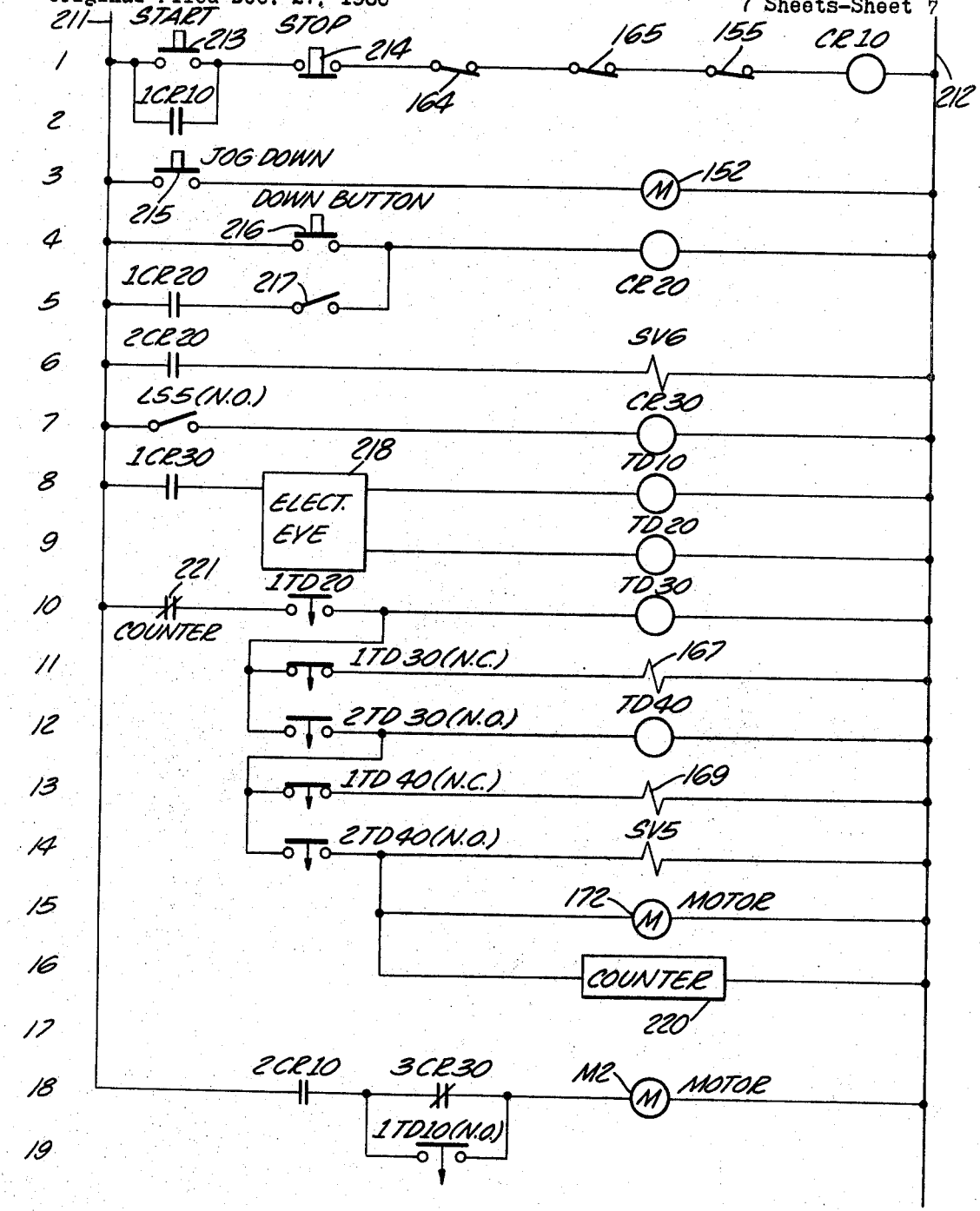

United States Patent Office 3,561,188
Patented Feb. 9, 1971

3,561,188
METHOD OF LOADING ARTICLES INTO AND UNLOADING THEM FROM CELLULAR CONTAINERS
Keith B. Cleland, Azusa, Calif., assignor, by direct and mesne assignments, to Hunter Industries, Inc., Santa Fe Springs, Calif.
Application Dec. 27, 1966, Ser. No. 604,849, which is a continuation of application Ser. No. 824,717, Apr. 2, 1969. Divided and this application Mar. 20, 1969, Ser. No. 823,229
Int. Cl. B65b 21/10
U.S. Cl. 53—26      6 Claims

ABSTRACT OF THE DISCLOSURE

A method of and apparatus for positively holding, and loading and unloading articles such as large, empty, light weight, square, slippery plastic milk bottles into and out of a magazine so that they do not jam the handling apparatus. Typically the bottles, after molding may sometimes be made at the place of business of a plastic manufacturer and used at some other location. The light weight, resilience, and slippery surface of empty plastic milk bottles make them extremely difficult to handle. This difficulty is overcome through the use of the present invention in that movement of each bottle is positively guided and handled throughout the entire handling apparatus.

CROSS REFERENCE TO RELATED APPLICATION

This application is a division of my copending application Ser. No. 604,849, filed Dec. 27, 1966, now abandoned in favor of continuation application Ser. No. 824,717, filed Apr. 2, 1969.

BACKGROUND OF THE INVENTION

This invention relates to the article handling art, and more particularly to a method of positively guiding and handling large, light weight, resilient articles.

Although the present invention will have a wide variety of uses and should not therefore be limited to those specifically disclosed herein, the invention has been found to have exceptional utility in transporting plastic milk bottles from the location of a plastic manufacturer to dairies at different locations.

The advent of plastic bottles of all kinds for all kinds of uses has created not a few problems in handling when they are made at one place and filled at another place located a substantial distance away from the place where they are made. These difficulties are due to the fact that empty plastic bottles are often very light in weight as compared with their sizes. They are all somewhat resilient. The surface of the plastic is also often slippery. All of these factors make the handling of plastic bottles extremely difficult. Their empty, light weight, large size and resilience are a problem because they can cock or jump out of position very easily while being loaded, unloaded or transported. This will cause the handling apparatus to become jammed.

SUMMARY OF THE INVENTION

In accordance with the present invention, the above-described and other disadvantages of the prior art are overcome by positively guiding and handling articles such as square plastic milk bottles.

For example, square plastic milk bottles may be located in a vertical position contiguous to one another so that their front and rear faces contact adjacent bottles. In addition, the sides of the bottles are engaged to hold the bottles in their upright positions. Their mutually contiguous positions can serve to keep all bottles upright which is an important feature of the invention.

Considering the invention more specifically, the primary object thereof is to provide a method of handling articles, such as square plastic milk bottles, in conjunction with an open-bottomed container for tiered rows of articles, which includes the steps of: moving rows of articles seriatim in single file to a loading position beneath the open-bottomed container; moving successive rows of articles upwardly into the container through its open bottom to form a stack of rows of articles within the container; removing rows of articles from the container seriatim through its open bottom, at an unloading position; moving the rows of articles removed from the container away from the container in sequence and in single file; and confining the articles in each row as it is moved upwardly into and downwardly out of the container.

The above-described and other advantages of the present invention will be better understood from the following description when considered in connection with the accompanying drawings.

BRIEF DESCRIPTION OF THE DRAWINGS

In the drawings which are to be regarded as merely illustrative;

FIG. 1 is a side elevational view of certain component parts of the apparatus of the present invention which is employed in practicing the method thereof;

FIG. 2 is a perspective view of a plastic milk bottle, partly broken away, with which the present invention is employed;

FIG. 3 is a perspective view of a container for milk bottles constructed in accordance with the present invention;

FIG. 4 is a side elevational view, partly in section, of apparatus constructed in accordance with the present invention;

FIG. 7 is a side elevational view, partly in section, of apparatus of the present invention wherein a container bottom panel is affixed to the container shown in FIG. 3 in order to keep milk bottles therein from falling out of the lower open end of the container;

FIG. 8 is a side elevational view, partly in section, of apparatus for removing the said bottom panel and placing a row of milk bottles on an exit conveyor;

FIG. 9 is a longitudinal sectional view taken on the line 9—9 of a portion of the apparatus shown in FIG. 8;

FIG. 10 is a sectional view of a bottom panel keeper taken on the line 10—10 shown in FIG. 8; and FIGS. 11 and 12 are schematic diagrams of electrical circuit means employed in loading and unloading the container, respectively.

DESCRIPTION OF THE PREFERRED EMBODIMENTS

Figure 5:
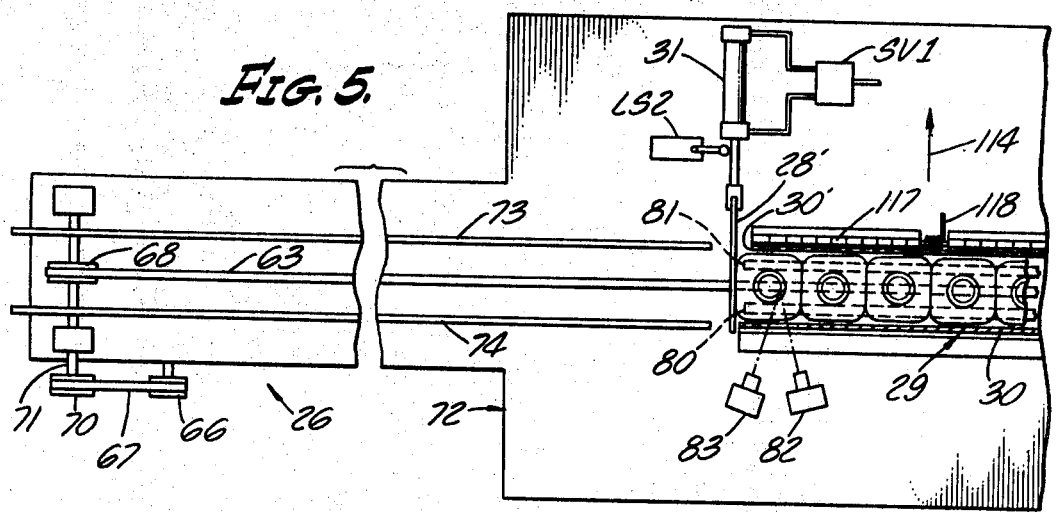
FIG. 5 is a top plan view, partly in section, taken on the line 5—5 of the apparatus shown in FIG. 4.

As stated previously, the method and apparatus of the present invention are by no means limited to the handling of a square plastic milk bottle. However, the invention has been found to be especially useful in handling such an article as shown at 20 in FIG. 2. In order to clarify the relationship between the milk bottle 20 shown in FIG. 2 and the container therefor indicated at 21 in FIG. 3, note will be taken that the bottle 20 is greatly enlarged to show its shape. Thus, although container 21 has an open lower end as indicated at 22, and the space inside container 21 is divided up into compartments by the use of partitions 23, milk bottles, in rows, are loaded into container 21 between partitions 23. Thus, the view of milk bottle 20 in FIG. 2 is greatly enlarged in comparison with the view of the space between partitions 23 shown in FIG. 3.

Again, as stated previously, the present invention is especially adapted to handle square plastic milk bottles such as that shown at 20 in FIG. 2. However, square plastic milk bottles such as 20 are, per se, old in the art. In actual practice, the milk bottles which are handled in accordance with the method and apparatus of the present invention may be entirely conventional.

In FIG. 1, some of the main steps and apparatus are shown in elevation. Apparatus for molding square plastic milk bottles is shown at 24. Apparatus 24 may also be entirely conventional. Square plastic milk bottles are taken from apparatus 24 and placed in contiguous positions at 25 on a belt conveyor 26. The step of transferring the milk bottles to the appropriate positions at 25 after they have been taken from the output of apparatus 24 may be done either automatically or manually. No automatic means are disclosed herein. Such automatic means may be conventional, if desired.

Milk bottles 25 are transported by conveyor 26 in a direction indicated at 27 up against a gate 23 of a housing 29. As will be apparent, housing 29 is a loading housing. Loading housing 29 is rectangular in horizontal cross section. Loading housing 29 has two side walls, not shown in FIG. 1, which are spaced apart a distance just slightly wider than the width of square milk bottles 25. Milk bottles 25 then are positively guided into the side walls of loading housing 29 in stable, vertical positions. One side wall of loading housing 29 is indicated at 30. Before milk bottles 25 can be loaded into housing 29, gate 28 must be moved to a vertical position above that shown in FIG. 1. This step is accomplished by the use of a pneumatic or hydraulic ram 31 shown in FIG. 1.

As bottles 25 are loaded into housing 29 when gate 28 is open, the bottles at 25 are counted by counting means to be described. When housing 29 is full, ram 31 is actuated to close gate 28.

A second ram 32 is provided having lift means 33 located at the end of a piston rod 34 to lift bottles at 35 into a compartment into a container 36. Container 36 is identical to container 21. All the bottle containers disclosed herein are either rectangular or square. The containers have end walls at 37 and side walls at 38. The spacing of partitions 23 in container 21 is just slightly larger than the width of milk bottles 35. Thus, as before, milk bottles 35 are guided into the compartments in container 36 so that they will stay in erect, regular positions.

Note will be taken that containers 21 and 36 are of a height to take a considerable number of rows 35 of square plastic milk bottles. When one compartment has been filled in the containers 21 or 26, row is stacked upon row. As will be explained, means are provided to hold a plurality of stacked rows as each subsequent row of bottles is loaded into container 36.

In order to lift a row of milk bottles 35 into container 36, note will be taken that container 36 is held in a position directly above and in line with loading housing 29. For example, gate 28 is in vertical alignment with rear wall 38 (on the left side of container 36 in FIGS. 1 and 4). Similarly, housing 29 has an end wall stop 39 which is in alignment with the other end wall 38 (on the right side of the container 36 as shown in FIGS. 1 and 4) of container 36. Still further, side walls 30 of loading housing 29 are in alignment with two adjacent partitions 23 of container 36. The space between the partitions 23 at each end of containers 21 and 36 may be the same as the distance that mutually adjacent partitions 23 are spaced apart. Thus, only one compartment of container 36 is loaded at one time. As will be explained, apparatus may be provided in accordance with the present invention for indexing container 36 from one compartment to the next until all the compartments of container 36 are loaded full of square plastic milk bottles.

All the bottles in containers 36 and 41 are kept inside the container until a bottom panel 40 is fixed to each of the containers 36 and 41. Automatic means at 42 are provided to raise bottom panel 40 to container 41.

Once container 41 is filled with square plastic milk bottles 43 and bottom panel 40 has been fixed to the previously open bottom 22 of container 41, container 41 is transported to the position of a container 44 shown in FIG. 1 by any conventional means. For example, as will be described, a container is transported from a position spaced from housing 29 to a position thereover as shown at container 36 and from that position to the position of panel loading means 42 and beyond. Note will be taken that container 36 is not actually transported to the right, as indicated by arrow 45, but is transported in a horizontal direction perpendicular to the conveyor 26. The conveyor means for the containers will be described in detail hereinafter. This same conveyor means transports a cantainer from a position over housing 29 to the position of container 41 over panel loading means 42, and beyond. After bottom panel 40 is fixed to container 41 and transported by the said conveyor means to a further point of handling, the said further point of handling may be any conventional means such as a fork truck for lifting containers into other trucks or the like for transporting containers. That transportation of the containers is indicated by an arrow 46. This transportation step may be, for example, from the location of mold apparatus 24 to a near or distant dairy or the like where square plastic milk bottles in the containers will be unloaded and used.

At the location where the milk bottles are to be filled, bottom panel support means are provided at 47 to receive a bottom panel 48. A container is therefore transported from the position of container 41 to the position of container 44. Again, a container is transported from the postion of container 44 to the position of a container 49 shown in FIG. 1. The latter transporting step is indicated by an arrow 50. Although bottom panel 48 is removed from container 44, special means are provided to retain milk bottles in a container as it is transported from the position of container 44 to the position of container 49. Again, arrow 50 is not directionally accurate as arrow 45 is not. That is, with the milk bottles oriented as indicated at 51, 52 and 53, container 49 has a front panel 37 in the position shown in FIG. 1. In other words, the detail of rows of bottles shown adjacent containers 36 and 49 are turned 90° from the actual direction of motion of containers in the position of containers 36 and 49.

Container 49 is located in an unloading position. Unloading takes place in several steps. Bottles 51 are allowed to drop onto a support 54. Support 54 is then movable to a position closer to container 49 to retain all of the milk bottles in a row in an unloaded compartment of container 49. Movement of support 54 is followed by movement of a support 55 to drop bottles 52 on a belt conveyor 56 as indicated at 53. Belt conveyor 56 moves bottles 53 in the direction of an arrow 57 into utilization apparatus 58. Further detailed description will be required in order to fully understand the steps illustrated in FIG. 1. However, suffice to say here that conveyors 26 and 56 may be entirely conventional. A container 49 thus guides positive movement of milk bottles as they are unloaded. As will be explained, an unloading housing, similar in a way to unloading housing 29, is provided to positively retain and guide bottles at 51, 52 and 53. A gate at 59 is provided, operated by a ram 60. Gate 59 is closed to provide guiding movement as in the case of gate 28. On the other hand, bottles are placed on conveyor 56 in rows, and bottles 53 are allowed to exit on conveyor 56 from the loading position thereof only when gate 59 is open. Gate 59 thus is closed and opened intermittently.

As will be noted from the foregoing, several rams may be employed in the apparatus of the present invention. All of the rams may either be pneumatic or hydraulic. In any event, the rams themselves may be entirely conventional.

As is now evident, some conveyor must be provided to transport containers. On the other hand, it is desirable to have the containers adapted for movement by a conveyor. These means include rollers 61 which ride in tracks to be described, and as shown in FIG. 3.

Further, bottom panels are clamped to contained 21 by clamp means 62 shown in FIG. 3. Clamp means 62 are provided on each side 38 of container 21.

As shown in FIGS. 4 and 5, conveyor 26 has simply a conventional V belt 63 which is moved in the direction of arrow 64 by a motor 65 that drives a sheave 66 around which a V belt 67 is located. Belt 63 extends around sheaves 68 and 69. Belt 67 is threaded around a sheave 70. Sheave 70 is fixed to a drive shaft 71. Sheave 68 is also fixed to shaft 71. As shown in FIGS. 4 and 5, the apparatus is mounted on a frame 72. Also fixed to frame 72 are a pair of guides 73 and 74 which are spaced apart a distance just slightly larger than the width of a milk bottle 75 shown in FIG. 4 to positively guide milk bottles to positions indicated at 76 and 77 in housing 29 shown in FIG. 4.

Due to the fact that milk bottles are so guided on conveyor 26, FIG. 1, belt 63 may be relatively narrow in comparison to the spacing of guides 73 and 74. The narrow character of belt 63 serves an additional purpose to be described.

Gate 28 may be vertical as shown in FIG. 1, or horizontal, as shown at 28' in FIGS. 4 and 5.

Means are provided at 78 to raise milk bottles into container 36 including a ram 79 which has U-shaped yokes at 80 and 81 to rise between the side walls of loading housing 29 on opposite sides of conveyor belt 63. This is perhaps best shown in FIG. 5.

Means 78 is actuated responsive to the detection of a specified integral number of bottles inside housing 29. Detection of the specified integral number of bottles which snugly fit inside housing 29, but not in compression therewith, is provided by means indicated at 82 and 83 see FIG. 5, 82 being a source of light, and 83 being a photocell connected to a counter (counter 1 of FIG. 11). Side walls 30 and 30' of housing 29 may be colored a dark color to prevent photocell 83 from operating the counter therein under the influence of ambient light. A sharp contrast, with perhaps a waxy or white color of the milk bottles, may provide sufficiently different reflection in order that milk bottles may be counted. Alternatively, a very dark or very light spot may be located on milk bottles to enable photocell and counter 83 to operate. As will be explained, counter 83 operates means 78 so that milk bottles in housing 29 are moved from the positions of milk bottles 76 and 77 to the position of a row of milk bottles 84 inside container 36 as shown in FIG. 4.

Means 78 is a support platform 85 to which yokes 80, 81 are fixed. An arrangement of a chain 86, sprockets 87 and 88, keep platform 85 level, chain 86 being fixed at its ends 89 and 90 to frame 72. A similar chain on the opposite side of support platform 85 at 92 goes around sprockets identical to sprockets 87 and 88. As before, chain 92 is fixed to frame 72 at 93 and 94.

To further guide the support platform 85, a pair of cylindrical rods or pipe is provided at 95 and 96. Pipes 95 and 96 are fixed to frame 72. Rollers at 97, 98 and 99 are located on opposite sides of pipe 95 to guide movement of support platform 85. Similarly, rollers are provided at 100, 101, and 102 on opposite sides of pipe 96.

Figure 6:
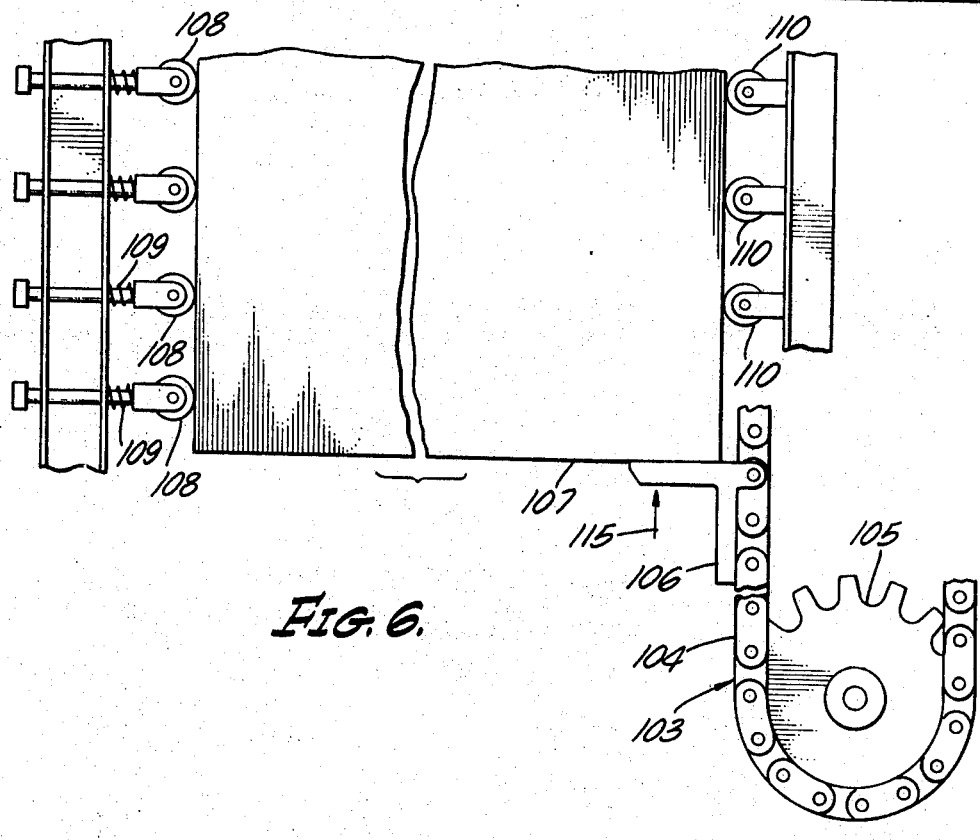
FIG. 6 is a top plan view of a conveyor employed to move the container cartridge shown in FIG. 3.

Means are provided including a conveyor 103 shown in FIG. 6 to transport containers. Conveyor 103 has a chain 104 and sprockets 105. Chain 104 carries lugs 106 which engage a container indicated at 107 in FIG. 6.

Longitudinal movement of container 107 is guided by rollers 108 which are biased by springs 109. Container 107 is also guided by rollers 110 on the opposite side of container 107.

As shown in FIG. 4, container rollers 61 ride in U-shaped channels 111 which are fixed to angle irons 112 that are, in turn, fixed to frame 72.

FIG. 7 is a side elevational view, partly in section, turned 90° from that shown in FIG. 4, illustrating equipment used in the lidding and sealing step represented by the position of the container 41 in FIG. 1. In other words, container 41 shown in FIG. 7 moves in the direction of an arrow 113 by the conveyor 103. Thus, container 36, at the position shown in FIG. 1, may move in a direction indicated by arrow 114 in FIG. 5. Container 107 moves in the direction of arrow 115 shown in FIG. 6.

As shown in FIG. 7, loading housing walls 30 or 30' closely fit milk bottle 116.

As shown in FIG. 7, loading housing wall 30' is pivoted at 117 and is held in a vertical position by a leaf spring 118. A limit switch 119 detects rotation of loading housing wall 30' to the left as viewed in FIG. 7. This will indicate that the loading apparatus is jammed and electrical power to all the apparatus will be shut off.

The upper ends of loading housing walls 30 and 30' each have detents at 120 and 120' which are pivoted about axes 121 and 122, respectively, to hold a milk bottle at the position 123 shown in FIG. 7. Projections 120 and 120' thus act as a check valve. As milk bottle 116 is lifted upwardly on yokes 80 and 81 from the position of milk bottles 116 shown in FIG. 7 to the position of milk bottle 123 shown in FIG. 7. Thus, projections 120 and 120' rotate apart as they are urged apart when milk bottle 116 is lifted upwardly inbetween projections 120 and 120'. Projections 120 and 120' are urged together by springs similar to spring 118, not shown.

As container 41 is moved in the direction of arrow 113 by conveyor 103, completely filled compartments of a container 124 are passed over a plate support 125. Milk bottles at 123 are injected behind milk bottles 126 until the compartments in container 124 are filled. After a compartment in container 124 is filled, plate 125 keeps the milk bottles from falling outwardly of the open bottom of container 124. At the same time, milk bottles in container 124 may be raised somewhat therein on the upper surface of plate 125 and 126. Surface 126 may be slightly inclined at 127, if desired, as shown in FIG. 7.

Container 124 is then moved to the position of container 41 shown in FIG. 7.

Bottom panels 128, 129, 130 and 131 are stacked upon a support 132 which is raised by apparatus 133 including an electric motor 134. Electric motor 134 is turned on manually each time a container approaches a bottom panel in the stack on support 132. Electric motor 134 is operated to place the uppermost of the stack of bottom panels either in line with or slightly below the upper surface 126 of plate 125. The electric motor 134 raises the stack on support 132 by the use of a lead screw 135 which extends through a gear box 136. As before, container 41 has a pair of clamp means 62 on opposite sides thereof. In order to clamp bottom panel 128 to container 41, clamp means 62 are moved from the position shown in dotted lines in FIG. 10 at 62' to a position shown in solid lines therein. A resilient pad 137 is fixed to an angle iron 138 that is, in turn, fixed to container 41. Resilient pad 137 acts as the spring means for keeping clamp means 62 in the position shown in solid lines. Note will be taken that a linkage 139 rotatable on an ear 140 fixed to container 41 goes past center from the position shown at 139' to the solid line position shown in FIG. 10. As is apparent, clamp means 62 may be operated manually.

Four rollers 140 are positioned inside a well 141 to guide movement of support 132 inside well 141. A limit switch at LS1 is fixed to a stop 143. A ram 144 withdraws stop 143. Ram 144 is operated by a solenoid valve which is SV5.

The next step in the method of the present invention is transporting containers as indicated by arrow 46 in FIG. 1. After bottom panel 128 has been affixed to container 41, it is moved to the position of container 49 as shown in FIG. 8. Immediately prior to movement of container 41 to the position 49 shown in FIG. 8 in the direction of an arrow 145, container 49 passes over a bottom panel well 146 which receives bottom panels 147, 148, 149 and 150 in succession. Means at 151 is employed including an electric motor 152 to lower the bottom panels inside well 146. Thus, means 151 may be identical to means 133 and may be operated by motor 152 or may likewise be manually operated. Well 146 has a stop 153 at the left end thereof as viewed in FIG. 8. Stop 153 is raised and lowered by a ram 154 which is operated by a solenoid valve SV6. Stop 153 is raised to engage the bottom panel fixed to a container. A limit switch 155 is fixed to stop 153 to stop a conveyor 103' similar to but independent of conveyor 103. The clamp means 62 are then operated to release a bottom panel from a container. Stop 153 is then lowered to allow container 49 to move over to the position shown in FIG. 8. Bottles 156 in container 49 are prevented from falling outwardly thereof by a plate 157.

Bottles 156 drop into an unloading housing 158 to the position of bottle 159' resting on support 54. Unloading housing 158 has end walls 160 biased by a spring 161 (FIG. 8) as in the case of spring 118 (FIG. 7). The same is true of a side wall 162 that is biased by a spring 163. Side wall 160 has a corresponding limit switch 164 and side wall 162 has a corresponding limit switch 165. Limit switches 164 and 165 are normally closed. When they are open, they shut off all electrical power in the unloading operation. They, like limit switch 119, act as safety devices in case the unloading apparatus becomes jammed, while container 49 is being indexed.

As stated previously, bottles at 156 fall into unloading housing 158 to the position of bottle 159' therein. In this position, bottles at 159' rest upon support 54. Before the bottles at 159' drop further into unloading housing 158, the space adjacent side wall 160 is vacated by allowing the last row in a container compartment to fall to the position indicated at 166 in FIG. 8. Support 54 is raised and lowered by a ram 166' operated by a solenoid valve 167. Similarly, support 55 is operated by a ram 168 through the use of a solenoid valve 169. Thus, once a row of bottles is positioned at 166, gate 59 shown in FIGS. 1 and 9 is opened, and conveyor 56 moves the row of bottles to a position wholly outside of unloading housing 158 as indicated at 53 in FIG. 1. At this point gate 59 is closed and support 55 is raised to the position shown in FIG. 8. Bottles 159' are then dropped by lowering support 54.

Support 55 is then lowered to allow bottles at 159 to drop into the position of bottles 166. As stated previously, gate 59 is opened and bottles at 166 are removed from unloading housing 158 by conveyor 56.

An electric eye at 220 determines the existence of a row of bottles at 166.

Note will be taken that unloading housing 158 has a cross section to closely fit the square shape of the milk bottles. Unloading housing 158 has fixed side walls at 170 and 171 opposite side walls 160 and 162. Unloading housing 158 also has a rear wall to act as a stop at one end. The said end wall may be identical to end wall 39 shown in the loading operation in FIG. 1. However, note will be taken that loading housing 29 is approximately one bottle height, whereas the end wall in the unloading housing 158 is approximately two bottle heights. As in the case of gate 28, gate 59 is employed to contain a row of bottles closely so as to guide their dropping motion into unloading housing 158. If desired, the height of gate 59 need only be one bottle height. If so, an end wall should be provided to closely fit milk bottles at the position indicated at 159 in FIG. 8.

Motors for conveyors 103 and 103' have not been shown. However, a motor for conveyor 56 is shown at 172 in FIG. 8. The motors for conveyors 103 and 103' may be entirely conventional.

ELECTRICAL CONTROLS

Figure 11:
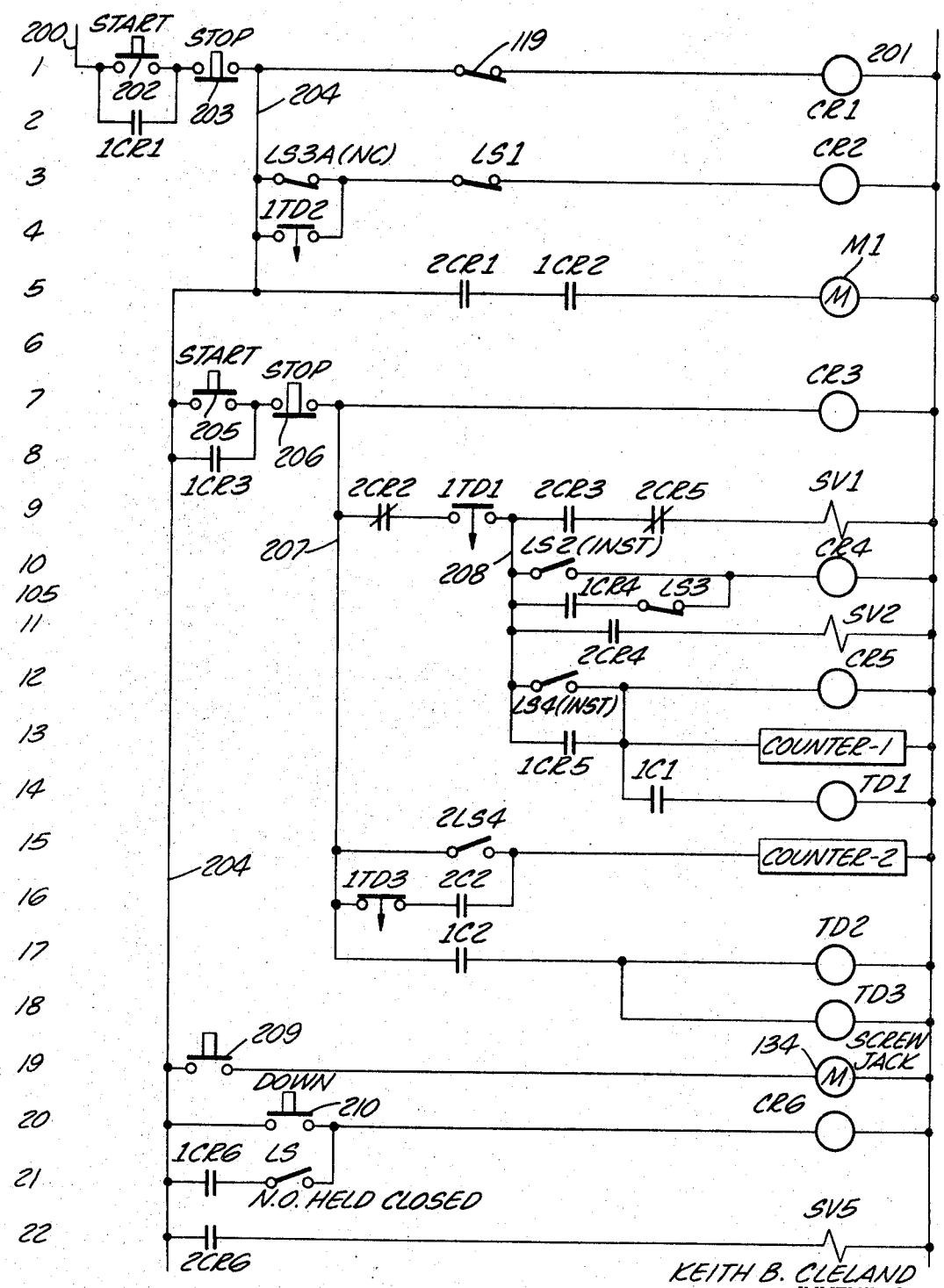

Electrical and electrochemical apparatus for operating the apparatus of the present invention shown in FIGS. 1 to 10 inclusive, is illustrated in FIGS. 11 and 12. If desired, the apparatus for controlling the loading step may be entirely separate and apart from the apparatus for controlling the unloading step. In particular, the apparatus for controlling loading is shown in FIG. 11. The apparatus for controlling unloading is illustrated at FIG. 12.

Loading

The circuit for operating the apparatus of the present invention during loading is shown in FIG. 11. Input leads are provided at 200 and 201. Connected serially with these leads are a normally operable stop switch 202, a normally closed manually operable stop switch 203, limit switch 119 (FIG. 7) and a relay CR1. Switches 202 and 203 are momentary contact switches, although stop switch 203 is normally closed and start switch 202 is normally open. Relay CR1 has open contacts 1CR1 connected in parallel with start switch 202.

The circuit of FIG. 11 also has an auxiliary lead 204. A limit switch LS3A shown in FIG. 7 is connected between leads 204 and 201 through limit switch LS1 and a relay CR2. Limit switches LS3A and LS1 are normally closed. A pair of time delay relay contacts 1TD2 is connected in parallel with limit switch LS3A. A second pair of relay contacts 2CR1 of relay CR1 is connected serially with a pair of contacts 1CR2 of relay CR2 and in series with motor M from lead 204 to lead 201. Contacts 2CR1 and 1CR2 are both normally open. A second start switch 205 and a stop switch 206 are connected serially with relay CR3. Relay CR3 has contacts 1CR3 connected in parallel with start switch 205. The junction of stop switch 206 and relay CR3 has a lead 207 connected therefrom. Relay CR2 has a second pair of normally closed contacts 2CR2 which is connected in series with four other circuit elements from lead 207 to lead 201. These other circuit elements are a pair of contacts 1TD1 of a time delay relay TD1 connected from lead 201, a second pair of contacts 2CR3 of relay CR3, a first pair of contacts 2CR5 of a relay CR5 connected from lead 201, and solenoid valve SV1 which causes gate 28' to close. A lead 208 is connected from the mutual junctions of contacts 1TD1 and 2CR3. Limit switch LS2 is connected from lead 208 through a relay CR4 to lead 201. Relay CR4 has a pair of contacts connected in series with limit switch LS3. This series connection is, in turn, connected in parallel with limit switch LS2. Relay CR4 also has a second pair of contacts 2CR4 connected from lead 208 to solenoid valve SV2 which raises support 85.

Limit switch LS4 is connected from lead 208 to lead 201 through relay CR5. The junction of limit switch LS4 and relay CR5 is connected to counter 1 and to one side of a series circuit of counter 1C1 and time delay relay TD1. A pair of contacts 1CR5 is connected in parallel with limit switch LS4.

Limit switch LS4 also has a second pair of contacts 2LS4 connected from lead 207 to lead 201 through counter 2. A counter 2 and pair of contacts 1C2 are connected from lead 207 to time delay relays TD2 and TD3, both of which are connected to lead 201. The delay relay TD3 has a pair of contacts 1TD3 connected in series with a second pair of contacts 2C2 of counter 2. This series circuit is connected in parallel with limit switch contacts 2LS4. A switch 209 is connected from lead 204 to motor 134 of the bottom panel well 141. A switch 210 is connected from lead 204 through a relay CR6. Relay CR6 has a pair of contacts 1CR6 connected in series with a limit switch LS. This series circuit is, in turn, connected in parallel with switch 210. Relay CR6 has a second set of contacts 2CR6 that are connected in series with solenoid valve SV5 which lowers stop 143 and limit switch LS1 as shown in FIG. 7.

Unloading

The circuit for controlling unloading operations is shown in FIG. 12 including input power leads 211 and 212. Start and stop switches 213 are connected in series with switches 164, 165, 155 and relay CR10 from lead 211 to lead 212. Relay CR10 has a pair of first self-locking contacts, 1CR10 connected in parallel with start switch 213.

A momentary contact switch 215 is connected from lead 211 to lead 212 through motor 152. A switch 216 is connected from lead 211 through relay CR20 to lead 212. A series circuit of contacts 1CR20 of relay CR20 are connected in series with a switch 217. This series circuit is, in turn, connected in parallel with switch 216. Relay CR20 has a second set of contacts 2CR20 connected from lead 211 to lead 212 through solenoid valve SV6 which lowers stop 153. A normally open limit switch LS5 is connected from lead 211 to lead 212 through a relay CR30. Relay CR30 has a pair of contacts 1CR30 which is connected to an electric eye 218. Electric eye 218 is connected to lead 212 through time delay relays TD10 and TD20. A counter 220 is connected to lead 212. Counter 220 has contacts 221 which are connected in series with a set of contacts 1TD20 of time delay relay TD20 through a time delay relay TD30 to lead 212. Time delay relay TD30 has a pair of normally closed contacts connected from contacts 1TD20 through solenoid valve 167 to lead 212.

The delay relay TD30 has a pair of contacts 2TD30 which are normally open and are connected in series with a time delay relay TD40 which, in turn, is connected to lead 212. Time delay TD40 has a pair of normally closed contacts 1TD40 connected to solenoid valve 169. Time delay TD40 also has a pair of normally open contacts connected from contacts 2TD30 through solenoid SV5, motor 172 and counter 220 to lead 212.

Relay CR10 has a pair of normally open contacts 2CR10 connected through a third pair of normally closed contacts 3CR30 and a conveyor motor M2 to lead 212 from lead 211. Time delay relay TD10 has a pair of normally open contacts 1TD10 in parallel with contacts 3CR30.

OPERATION

Loading

The first step of the loading operation is to close the normally open contacts of start switch 202. This energizes relay CR1. Limit switch 119 operates simply as a safety switch and is not concerned with the loading operation while it is in progress. The circuit to relay CR1 is closed through stop switch 203 which is normally closed. Contacts 1CR1 of relay CR1 are normally open self-locking contacts.

Limit switch LS3A is employed in indexing the container from one compartment to the next. Limit switch LS3A is normally closed. Limit switch LS1 is also normally closed when container 41 does not engage it. Thus, relay CR2 is energized through limit switches LS3A and LS1 at the same time that relay CR1 is energized. Relay contacts 2CR1 and 1CR2 are thus both closed and container conveyor motor M1 is energized. Due to the fact that limit switch LS3A detects a partition 23, conveyor motor M1 indexes container 41 over loading apparatus 78. Thus, when limit switch LS3A is activated, relay CR2 is de-energized and contacts 1CR2 are opened. This stops conveyor motor M1. At the same time, de-energization of relay CR2 opens contacts 2CR2. Contacts 2CR2 thus prevent the loading operation to proceed while conveyor 103 is in operation.

Actual loading of a container is initiated by closing start switch 205. Solenoid valves SV1 and SV2 are spring return valves and operate only when they are energized. Before bottles are loaded into a container, gate 28' (FIG. 4) is open, support 85 is down and support 85 holds a complete row of bottles. Conveyor 26 may run continuously rather than intermittently, if desired.

When start switch 205 is closed, relay CR3 is energized through stop switch 206. Contacts 1CR3 act as self-locking contacts for relay CR3. Solenoid valve SV1 is then closed through contacts 2CR3 and 2CR5. At this point, gate 28' closes.

When gate 28' closes, limit switch LS2 is momentarily closed. This energizes relay CR4. Relay CR4 self-locks through pairs of contacts 1CR4 and LS3. Relay contacts 2CR4 are then closed, and solenoid valve SV2 is energized. When solenoid valve SV2 is energized, support 85 is raised. After a row of bottles have thus been injected into the container, limit switch LS3 de-energizes CR4. Solenoid valve V2 is then de-energized. Support 85 is then lowered.

Limit switch LS4 is then actuated. Relay CR5 is then energized. Relay CR5 then de-energizes solenoid valve SV1 by opening normally closed contacts 2CR5. Gate 28' opens when solenoid valve SV1 is de-energized. Counter 1 is energized by relay CR5 which now counts bottles entering loading housing 29 due to the action of photocell 82. After a predetermined number of bottles have been counted, counter 1 closes contacts 1C1 energizing time delay relay TD1. Time delay relay TD1 then pauses and opens contacts 1TD1 to cause all of the devices normally energized therethrough to de-energize and to repeat the loading operation. Time delay relay TD1 then again closes contacts 1TD1. The control circuit will then automatically energize solenoid valve SV1 and the loading cycle will repeat for the same container compartment.

If time limit switch LS4 is closed, the closing thereof is counted on counter 2. At a predetermined number of closings, counter 2 closes contacts 1C2 and 2C2. Counter 2 therefore counts the numbers of rows of bottles injected into a container. Counter 1 counts each bottle in a row.

Time delay relay TD2 is energized through counter contacts 1C2. Time delay relay TD2 thus closes contacts 1TD2 to energize relay CR2 again. The conveyor moves forward and limit switch LS3A stops the container at the next compartment.

Simultaneously, as time delay relay TD2 is energized, relay CR2 is energized. This opens contacts 2CR2 in series with solenoid valve SV1. The loading steps accomplished by closing gate 28' and lifting support 85 are rendered impossible.

The delay relay TD3 deactivates counter 2 through contacts 1TD3 after the delay relay TD2 times out. When LS3A is open and relay CR2 is again energized, the system automatically starts to load itself. In other words, the system will reload when switch 205 is again closed.

Switch 209 is closed to raise member 132 in FIG. 7.

Switch 210 is then closed which energizes relay CR6 through self-locking contacts 1CR6. Energization of relay CR6 lowers stop 143 by closing normally open contacts 2CR6. The closing of relay contacts 2CR6 energizes solenoid valve SV5 to lower stop 143. Limit switch LS1 is then open to energize conveyor motor M1. The container then moves forward until a limit switch LS detects the absence of a container. Relay CR6 is then de-energized. Solenoid valve SV5 is then de-energized and stop 143 moves upwardly to the position shown in solid lines in FIG. 7.

Unloading

The circuit for controlling the unloading operation is shown at FIG. 12. To start the unloading operation, start switch 213 is closed. Relay CR10 is then energized and locks through contacts 1CR10. Conveyor motor M2 is then energized by contacts 2CR10. A container with a bottom panel thereon moves forward in the direction of arrow 145 as shown in FIG. 8.

11

The normal position of stop 153 is upward. The container hits limit switch 155 de-energizing relay CR10. Contacts 2CR10 open and motor M2 is de-energized.

The operator then unlocks both panels 147, etc. The operator depresses switch 215, and lid 147 is lowered to below stop 153 by motor 152. The operator then holds down switch 216 when bottom panel 147 is in the proper position. Relay CR20 is then energized. The side of a container has closed LS217. Contacts 1CR20 and 2CR20 are then closed. Contacts 1CR20 act as self-locking contacts for relay CR20. Contacts 2CR20 energize solenoid valve SV6. This causes stop 153 to move down and stay down while limit switch LS217 is held closed.

When stop 153 moves down, limit switch 155 is opened, and relay CR10 is again energized. Contacts 1CR10 are again closed and conveyor motor M2 moves the container.

When the container moves past limit switch LS217, relay CR20 is de-energized and the spring return of solenoid valve SV6 moves stop 153 upwardly to stop the next container.

As the container moves forward, it actuates limit switch LS5 which energizes relay CR30. This stops conveyor motor M2. Relay CR3 also energizes the electric eye 218 when contacts 1CR30 close. In turn, electric eye 218 energizes time delay relays TD10 and TD20.

If a bottle is dropped to the position 159' shown in FIG. 8, TD10 is de-energized. If no bottle drops to the position 159', there will be a time delay and TD10 will close. Motor M2 will then be turned on and the container and conveyor 103' will index one more compartment until LS5 again stops conveyor motor M2.

When a bottle drops to the position 159' in FIG. 8 TD10 is de-energized and TD20 is energized. When time delay relay TD20 is energized, it times out and contacts 1TD20 closed, energizing time delay relay TD30. This, in turn, energizes solenoid valve 167 opening trap door 54. Trap door 54 stays open until time delay relay TD30 times out closing trap door 54. All bottles should now be in a position 159 shown in FIG. 8. When time delay relay TD30 times out, it closes contacts 2TD30, energizing time delay relay TD40. This instantly opens trap door 55 by energizing solenoid valve 169.

The delay relay TD40 times out opening contacts 1TD40 de-energizing solenoid valve 169, and trap door 55 closes. Time delay relay TD40, as it is timing out, closes contacts 2TD40. This energizes solenoid valve C5 opening gate 59 shown in FIG. 9. Conveyor motor 172 is then energized.

Counter 220 now counts the bottles coming out of the container. When a predetermined number of bottles come out of the container, counter contacts 221 open instantaneously, de-energizing the entire circuit of FIG. 12 at and below the position of counter contacts 221 therein.

Time delay relay TD20 now starts the entire action over again. When electric eye 218 can see across the unloading housing 158, time delay relay TD10 will be energized. Time delay relay TD20 will be de-energized. A delay will be incurred, and then time delay relay TD10 will close turning on motor M2. This will index the container to the next partition when limit switch LS5 will again stop motor M2.

From the foregoing description, note will be taken that some of the steps of the method of the present invention are performed manually. All of these steps may be performed manually or automatically.

From the foregoing, it will be appreciated that the invention is not limited to handling square plastic milk bottles, but may be used to house any other solid object.

Further, loading and unloading may be reversed, although the apparatus and method disclosed hereinbefore is preferred. That is, bottles may be dopped into a container for loading, and may be pulled vertically upwardly out of a container when unloading. If desired, the leading edge of a container may be made a short distance higher

12 than the partitions 23 therein. Note will be taken that a wide variety of features of both the method and apparatus of the present invention have been disclosed. Along this same line, note will be taken that one feature or step in the apparatus or method, respectively, may be used without the other. Any such apparatus or step would then fall within the scope of the claims to follow.

From the foregoing, it will be appreciated that the method and apparatus of the present invention are especially directed to handling articles which are relatively large in comparison to their weight and size. Movement of the milk bottles are guided positively throughout so that they cannot get out of line. Specially dimensioned loading housing 29 and the containers which are loaded thereby facilitate the guiding positive handling steps in accordance with the present invention. The same is true of the unloading housing 158. The fact that the plastic milk bottles of the present invention are also somewhat resilient creates a problem which the present invention solves by positively guiding movement of the milk bottles at all times. Milk bottles which are handled in accordance with the present invention are thus kept from cocking or jumping out of position and the apparatus is kept free from jamming.

Although several embodiments of the present invention have been described and illustrated herein, many changes and modifications thereof will of course suggest themselves to those skilled in the art. The present invention should therefore not be limited to the embodiments selected for this disclosure, the true scope of the invention being defined only in the appended claims.

What is claimed is:

1. The method of loading an open bottomed receiver with articles, said method comprising the steps of: placing said receiver in an upright position on a loading platform with the open bottom of said receiver directed downwardly against said platform; moving said receiver with respect to said platform such that an aperture in said platform is positioned under the open bottom of said receiver; loading articles into said receiver by directing them through said aperture; moving said receiver with respect to said aperture such that said articles are supported by said platform; loading additional articles into said receiver by directing them through said aperture, and then moving said receiver with respect to said aperture such that the said additional articles are contained within said receiver and supported by said platform, alternately loading articles into said receiver through said aperture followed by movement of said receiver with respect to said aperture until the open end of said receiver has progressed past said aperture and said receiver has been substantially filled with articles by inserting them into said open bottom through said aperture, sealing the open end of said receiver after said receiver is substantially filled with articles, placing said sealed receiver in an upright position with its sealed bottom directed downwardly against an unloading platform having an aperture therein, opening the sealed bottom of said receiver, moving the unsealed and open bottom of said receiver such that a part thereof is positioned over said aperture, removing articles from said receiver through said aperture while the remaining articles within said receiver are supported by contact with said unloading platform, moving said receiver with respect to said aperture and removing further articles from said receiver through said aperture, and alternately removing articles from said receiver through said aperture followed by moving said receiver with respect to said aperture until said receiver has been substantially unloaded through said aperture.

2. The method of handling solid objects, said method comprising the steps of: loading rows of objects at a predetermined loading position and seriatim into the cells of of a cellular container; retaining said objects in said container; transporting said container to a predetermined unloading position with said objects stacked vertically therein; aligning one cell in said container over a vertical housing having a cross sectional configuration substantially the same as each cell; removing the support for the objects in said cell; checking the fall of the bottom row of objects in said one cell to the height of the objects in said bottom row; retaining the remainder of the objects in said one cell over said bottom row; dropping said bottom row onto conveyor means; and repeating all of the foregoing steps to drop the row immediately above said bottom row of objects in each cell onto said conveyor means seriatim.

3. The method of handling light weight, slippery objects, comprising the steps of: injecting rows of objects into a container having a plurality of rectangular cells therein while holding in rows of objects already injected thereinto; transporting said container to an unloading position; placing one cell over an unloading housing having a cross section the same as each of said cells; releasing the bottom row in said one cell into said housing; checking the fall of said bottom row to the height thereof; retaining the objects above said bottom row inside said one cell; dropping said bottom row onto conveyor means; repeating the aforementioned steps until each row of each cell is dropped onto said conveyor means.

4. The method of handling light weight, slippery objects, comprising the steps of: moving a first row of contacting objects in between the vertical side walls of a loading housing and against a vertically extending terminal stop at the end thereof, said objects having parallel front and rear surfaces perpendicular to their path of movement; closing a gate at the forward end of said loading housing to enclose said first row in a manner such that said walls, said stop and said gate lie contiguous to the objects in said first row; locating one of the cells in a cellular container over, contiguous to and in alignment with said loading housing, said loading housing and each cell of said container having rectangular cross sections of the same dimensions; pushing said first row of objects out of said loading housing up into said one cell; holding said first row of objects inside said container; repeating the aforesaid steps until all the cells of said container are filled; placing one cell over an unloading housing having a cross section the same as each of said cells; releasing the bottom row in said one cell into said housing; checking the fall of said bottom row to the height thereof; retaining the objects above said bottom row inside said one cell; dropping said bottom row onto conveyor means; repeating the aforementioned steps until each row of each cell is dropped onto said conveyor means.

5. The method of handling milk bottles or the like, said method comprising the steps of: conveying a row of light weight, slippery elongated plastic bottles to a position contiguous to each other on lift means immediately below a a cellular container, said bottles having a substantially square cross section, said container having a plurality of vertically extending cells substantially rectangular in cross section and of a width slightly larger than the bottle width to hold a bottle in a substantially vertical stable position with the side walls of said cell being positioned contiguous to the bottles, each said cell having a length such that both end walls thereof fit contiguous, respectively, to the bottles at each end of said row, each said cell having a height slightly larger than the combined height of a plurality of bottles; moving said lift means vertically to load said row of bottles into a first cell of said container; holding said first row of bottles in said container; lowering said lift means; repeating said conveying step on a second row of bottles; repeating said moving step to inject said second row of bottles into said container behind said first row to lift said first row further into said first cell; holding said second row in said container; repeating said lowering, conveying, moving and holding steps until said first cell is filled with bottles; holding all the bottles inside said first cell; moving said container in a manner to place a next succeeding second cell in said container in a vertical position over said lift means; filling said second cell with a second set of rows of bottles in the same manner as said first cell was filled; filling each succeeding cell in the same manner as said first and second cells were filled until all of the cells in said container are filled; releasing the last row of bottles in one of said cells into a housing having a rectangular cross section the same size as that of each cell; checking the fall of the bottles in said last row to limit the distance of the fall thereof into said housing to approximately one bottle height; retaining all the rows in said one cell except said last row; releasing said last row onto a conveyor; repeating the immediately preceding four steps until said one cell is emptied of bottles; moving said container until the next succeeding cell lies in alignment with said housing; unloading all the bottles in said next succeeding cell by performing said four steps for each row of bottles therein; and repeating the immediately preceding moving and unloading steps until all the cells in said container are removed therefrom.

6. A method of handling articles in conjunction with an open-bottomed container for tiered rows of articles, including the steps of:
(a) moving rows of articles seriatim in single file to a loading position beneath the open-bottomed container;
(b) moving successive rows of articles upwardly into the container through its open bottom to form a stack of rows of articles within the container;
(c) removing rows of articles from the container seriatim through its open bottom, at an unloading position; and
(d) moving the rows of articles removed from the container away from the container in sequence and in single file.

References Cited
UNITED STATES PATENTS

| | | | |
|---|---|---|---|
| 2,171,650 | 9/1939 | Hack | 53—160 |
| 2,526,309 | 10/1950 | Welch | 214—307 |
| 2,596,339 | 5/1952 | Lufkin | 53—243X |
| 2,826,023 | 3/1958 | Bofinger | 53—243X |
| 2,869,297 | 1/1959 | Neer | 53—243X |
| 3,426,500 | 2/1969 | Rupert | 53—37 |

FOREIGN PATENTS 526,453  5/1931  Germany.

THERON E. CONDON, Primary Examiner

R. L. SPRUILL, Assistant Examiner

U.S. Cl. X.R.
53—37; 214—152